US012798505B2

(12) United States Patent
Kirigaya

(10) Patent No.: US 12,798,505 B2
(45) Date of Patent: Nov. 17, 2026

(54) ATTACHING MEMBER

(71) Applicant: MAZDA MOTOR CORPORATION, Hiroshima (JP)

(72) Inventor: Kenki Kirigaya, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 233 days.

(21) Appl. No.: 18/882,125

(22) Filed: Sep. 11, 2024

(65) Prior Publication Data

US 2025/0121788 A1 Apr. 17, 2025

(30) Foreign Application Priority Data

Oct. 17, 2023 (JP) ................................. 2023-178629

(51) Int. Cl.

*B60R 13/04* (2006.01)
*B60R 11/00* (2006.01)
*B60R 13/00* (2006.01)
*B60R 19/52* (2006.01)

(52) U.S. Cl.

CPC ............ *B60R 19/52* (2013.01); *B60R 13/005* (2013.01); *B60R 2019/525* (2013.01)

(58) Field of Classification Search

CPC ....... B60R 2011/004; B60R 2011/0042; B60R 13/005; B60R 13/00; B60R 2011/0043; B60R 2011/0045; B60R 2019/525; B60R 2019/527

USPC .................. 296/193.1; 293/155, 115; 40/591

See application file for complete search history.

(56) References Cited

U.S. PATENT DOCUMENTS 4,875,728 A * 10/1989 Copp ...................... B60R 19/24 293/142
8,678,454 B2 * 3/2014 Abe ........................ B60R 19/50 40/200
8,922,655 B2 * 12/2014 Forgue .................... B60R 19/52 348/148
10,576,922 B2 * 3/2020 Yasui ................... B60K 11/085
11,305,742 B2 * 4/2022 Singh ...................... B60S 1/528
2008/0201914 A1 * 8/2008 Turner .................... F16B 5/123 24/289

(Continued)

FOREIGN PATENT DOCUMENTS

JP 2019-217934 A 12/2019

*Primary Examiner* — Vivek D Koppikar
*Assistant Examiner* — Daniel Guang-Dian Chen
(74) *Attorney, Agent, or Firm* — Studebaker Brackett PLLC

(57) ABSTRACT

An attaching member comprises a first member including an engaging portion and a first engaging portion to engage with a first frame portions from one side of a second direction and a second member including an engaged portion and a second engaging portion to engage with a portion of the first frame portion which is positioned on the other side, in the second direction, of the first engaging portion from the other side of the second direction. The engaging portion includes an inclined portion positioned on the above-described one side of the second direction and extending obliquely from a tip of the engaging portion toward its base portion and from the above-described other side of the second direction to the above-described one side of the second direction. A portion of the engaging portion positioned on the above-described one side of the second direction engages with the engaged portion.

10 Claims, 9 Drawing Sheets

(56) References Cited

U.S. PATENT DOCUMENTS

| | | | | |
|---|---|---|---|---|
| 2020/0400180 | A1* | 12/2020 | Steltz .................... | F16B 5/0657 |
| 2022/0250463 | A1* | 8/2022 | Ishibashi ................ | B60K 11/08 |

* cited by examiner

ATTACHING MEMBER

BACKGROUND OF THE INVENTION

The present invention relates to an attaching member.

Japanese Patent Laid-Open Publication No. 2019-217934 discloses an attachment structure for assembling an emblem to a grill of a vehicle. This patent document discloses the structure in which an emblem member having a penetration hole and a grill having a pin to be inserted into this penetration hole work together for stabilizing setting of the emblem member.

As disclosed in the above-described patent document, it is general to provide a fastening structure at an attached member in a case where an attaching member, such as the emblem, is attached to the attached member, such as the grill.

However, when the above-described fastening structure disclosed in the patent document is not provided previously, any other structure for attaching the attaching member may be necessary additionally. Herein, since some backlash (looseness) may occur due to its inappropriate attaching manner, some proper attaching structure for stabilizing attachment without backlash may become necessary.

SUMMARY OF THE INVENTION

An object of the present invention is to provide an attaching member which can be properly attached to an attached member in a stable state with no backlash (looseness), without providing any particular fastening structure at the attached member.

The present invention is an electric automobile an attaching member to be attached to an attached member, wherein the attached member comprises a pair of first frame portions which extend in a first direction, respectively, and are separated from each other in a second direction crossing the first direction, the attaching member comprises a first member including a first engaging portion which engages with the first frame portions from one side of the second direction and a second member including a second engaging portion which engages with a portion of the first frame portion which is positioned on the other side, in the second direction, of the first engaging portion from the other side of the second direction, the first member includes an engaging portion which extends in a third direction crossing both directions crossing the first direction and the second direction and engages with the second member, the second member includes an engaged portion which the engaging portion of the first member engages with, the engaging portion includes an inclined portion which is positioned on the one side of the second direction and extends obliquely from a tip of the engaging portion toward a base portion of the engaging portion and from the other side of the second direction to the one side of the second direction, and a portion of the engaging portion which is positioned on the one side of the second direction engages with the engaged portion of the second member.

According to the present invention, since the inclined portion extending obliquely from the tip of the engaging portion toward the base portion of the engaging portion and from the other side of the second direction to the one side of the second direction is provided, the engaged portion can be engaged by the engaging portion by gradually moving the second member toward the base portion of the engaging portion of the third direction from a state where the second member is inclined toward the tip of the engaging portion of the third direction relative to the first member when being attached. Herein, the first member receives a force which is applied from the engaged portion to the other side of the second direction at the engaging portion. Since the first engaging portion engages with the first frame portion from the one side of the second direction, when the force applied to the other side of the second direction is inputted to the first member, the moving to the one side of the second direction is restricted at the first engaging member. Meanwhile, the second member receives a force which is applied to the one side of the second direction from the engaging portion at the engaged portion. Since the second engaging portion engages with the first frame portion from the other side of the second direction, when the force applied to the one side of the second direction is inputted to the second member, the moving to the other side of the second direction is restricted at the second engaging portion. This cooperation of the first and second members enables attaching of the first and second members to the engaged member, without providing any particular fastening structure at the engaged member. Further, the attaching member can be suppressed from having some backlash (looseness) in the second direction, thereby ensuring the attaching in the stable state.

In an embodiment of the present invention, the first engaging portion and the second engaging portion of the attaching member may be to engage with the first frame portion of the attached member from the same side of the third direction.

According to this embodiment, both of the first and second members can be attached from the same side of the third direction at the attached member, so that workability of the attaching can be improved.

In another embodiment of the present invention, the engaging portion of the first member may be provided with a rib portion which extends in the first direction and in the third direction and contacts the engaged portion of the second member.

According to this embodiment, the rigidity of the engaging portion can be increased, and also positioning of the engaging portion and the engaged portion can be facilitated in the engaging. Thereby, moving of the first and second engaging portions in the second direction can be restricted and also an appropriate force which may not deform the first and second engaging portions can be inputted.

In another embodiment of the present invention, each of the first engaging portion and the second engaging portion of the attaching member may be constituted by plural portions.

According to this embodiment, the moving of the first and second members can be restricted respectively at different points, so that backlash (looseness) of the members in the second direction can be suppressed securely.

In another embodiment of the present invention, the attaching member may further comprise a fastening member to fasten the first member and the second member.

According to this embodiment, the first and second members are fixed so securely that the backlash (looseness) of these members in the second direction can be suppressed more securely.

In another embodiment of the present invention, the attached member may be a grill for a vehicle which comprises the first frame portion and a second frame portion which extends in the second direction.

According to this embodiment, the first and second members can be attached to the grill for the vehicle, without providing any particular fastening structure at the grill for the vehicle, and the backlash (looseness) of the members in the second direction can be suppressed.

In another embodiment of the present invention, the first engaging portion and the second engaging portion of the attaching member may be a decorative member to be attached to the vehicle.

According to this embodiment, the decorative member can be attached to the grill for the vehicle, without providing any particular fastening structure at the grill for the vehicle, and the backlash (looseness) of the decorative member in the second direction can be suppressed.

The present invention will become apparent from the following description which refers to the accompanying drawings.

DETAILED DESCRIPTION OF THE INVENTION

Figure 1:
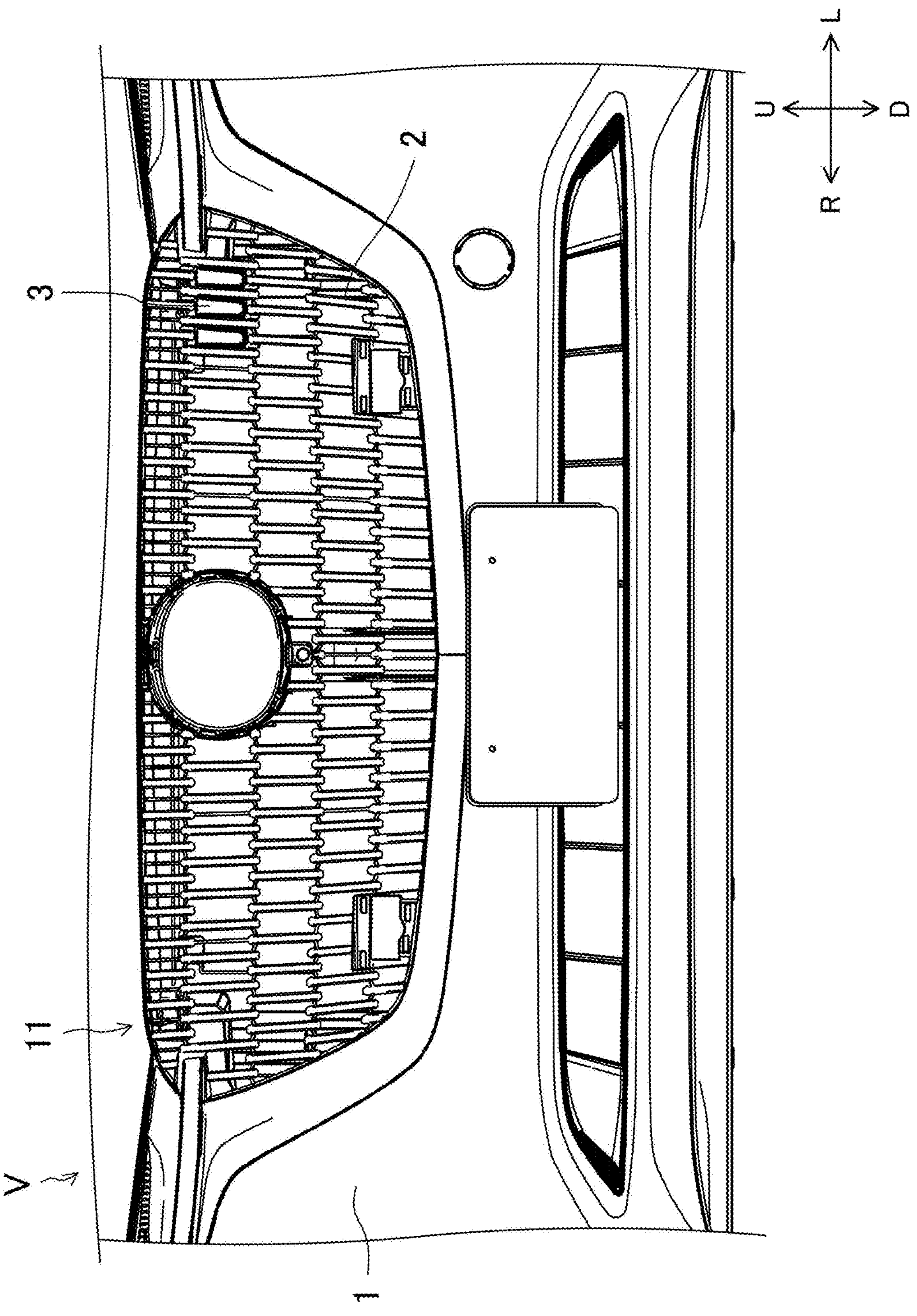
FIG. 1 is an elevational view of a front structure of a vehicle according to an embodiment.

Hereafter, an embodiment of the present invention will be described specifically referring to the drawings. Herein, the embodiment described below is just an example of the present invention, and therefore it does not to intend to restrict any application or use of the present invention. The following description and figures are appropriately omitted and simplified for clarification. In the figures, the same reference characters are used for the same elements, and some duplications are omitted as needed. In the drawings, directions mean the ones on the figures if not particularly referred to, and a vehicle longitudinal direction is shown by arrows F, B, a lateral direction, in a width direction, of a vehicle is shown by arrows L, R, and a vehicle vertical direction is shown by arrows U, D. Herein, in the embodiment, the parallel, horizontal, and vertical directions or the like have some tolerance enough not to hinder the effects of the present invention. The vehicle longitudinal direction corresponds to a third direction, the vehicle width direction corresponds to a first direction, and the vehicle vertical direction corresponds to a second direction.

Embodiment

A front structure of a vehicle V will be described referring to FIG. 1. FIG. 1 schematically shows main components of a front portion of the vehicle V, and illustration of other members, such as a bonnet and a shroud panel, is omitted here. A bumper face 1 which extends in the vehicle width direction is provided at the front portion of the vehicle V.

The bumper face 1 is formed in a gently-curved shape such that a center, in the vehicle width direction, thereof protrudes forward, and covers over a front-end part of the vehicle. The bumper face 1 has a grill opening 11 at a central portion, in the vehicle width direction, thereof. The grill opening 11 is a traveling-air introduction hole, where a grill member 2 is provided.

The grill member 2 is formed in a grid shape in an elevational view, in a gently-curved shape such that a center, in the vehicle vertical direction, thereof protrudes forward slightly in a side view, and in a gently-curved shape such that a center, in the vehicle with direction, thereof protrudes forward in a plan view. A decorative member 3 is attached to an upper-left area of the grill member 2. Herein, the decorative member 3 can be attached to any area of the grill member 2. The decorative member 3 is attached to the grill member 2, and the grill member 2 can be referred to as an "attached member" and the decorative member 3 can be referred to as an "attaching member."

Figure 2:
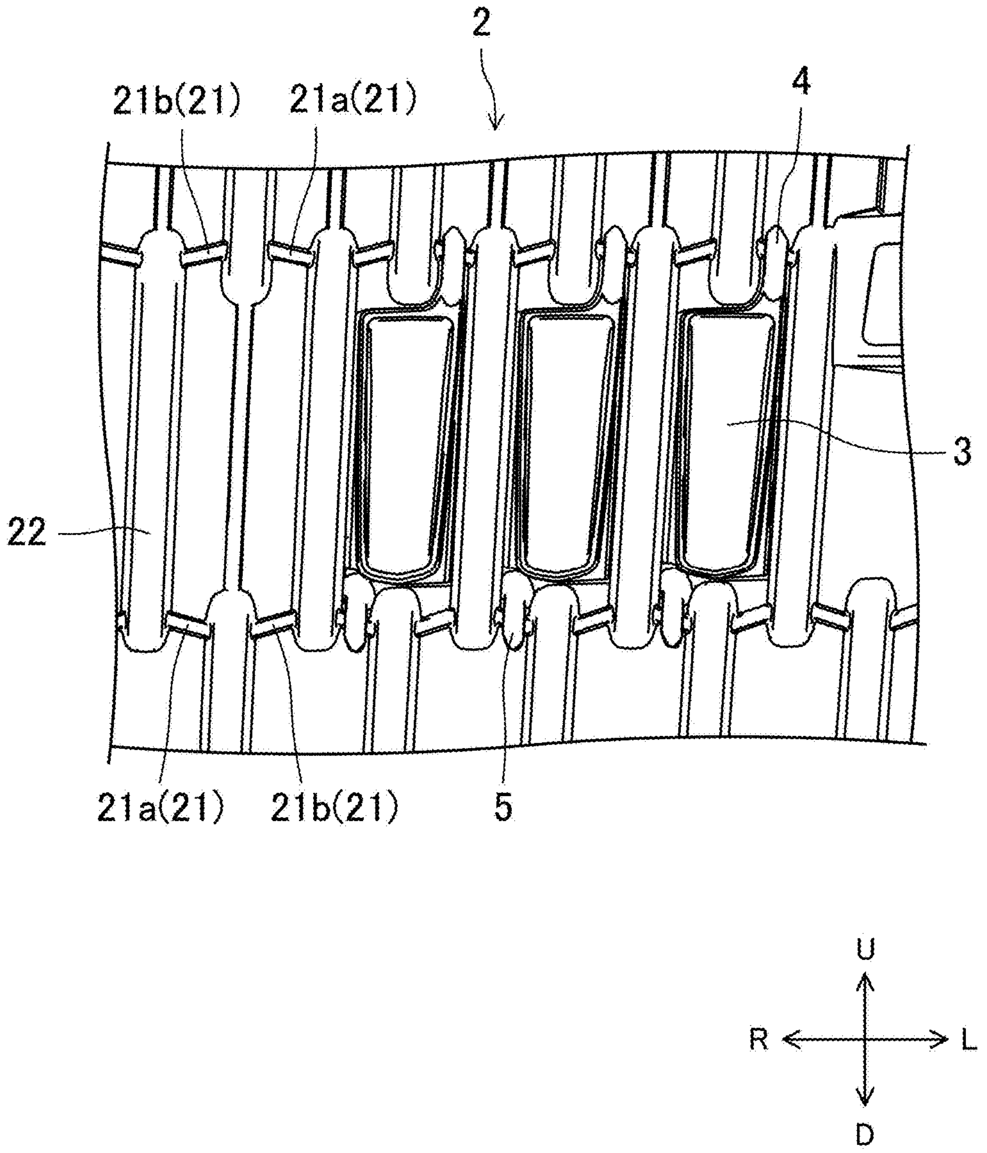
FIG. 2 is an elevational view of a decorative member which is attached to a grill for the vehicle in the front structure of the vehicle according to the embodiment.

A structural example of the grill member 2 and an attachment example in which the decorative member 3 is attached to the grill member 2 will be described referring to FIG. 2. FIG. 2 is an elevational view of an enlarged area where the decorative member 3 is attached to the grill member 2. The decorative member 3 has a design surface at its front face in the elevational view.

The grill member 2 comprises plural lateral portions 21 and plural vertical portions 22 which are integrated, and is of a grid shape in the elevational view. The lateral portion 21 includes a first lateral portion 21*a* and a second lateral portion 21*b*. The first lateral portion 21*a* is formed in a bar shape extending substantially in the vehicle width direction such that it is inclined slightly upward from its left side toward its right side. The second lateral portion 21*b* is also formed in a bar shape extending substantially in the vehicle width direction such that it is inclined slightly upward from its right side toward its left side. The thickness of these portions 21*a*, 21*b* are substantially the same. The grill member 2 is configured such that the first lateral portions 21*a* and the second lateral portions 21*b* are formed mutually in the vehicle width direction. The lateral portions 21 (21*a*, 21*b*) are separated from each other in the vehicle vertical direction. The lateral portion 21 corresponds to a first frame portion.

The vertical portion 22 extends in the vehicle vertical direction and is of a rectangular shape having a larger thickness than the first lateral portion 21*a* and the second lateral portion 21*b*. The vertical portion 22 is configured such that its upper-end portion is interposed between a left-side end portion of the first lateral portion 21*a* and a right-side end portion of the second lateral portion 21*b*, and that its lower-end portion is interposed between a right-side end portion of the first lateral portion 21*a* and a left-side end portion of the second lateral portion 21*b*. The vertical portion 22 corresponds to a second frame portion.

The plural first lateral portions 21*a* are parallel to each other, the plural second lateral portions 21*b* are parallel to each other, and the plural vertical portions 22 are parallel to each other.

The decorative member 3 comprises a first member 4 and a second member 5. The first member 4 and the second member 5 engage with each other and they are attached to the grill member 2.

Figure 3:
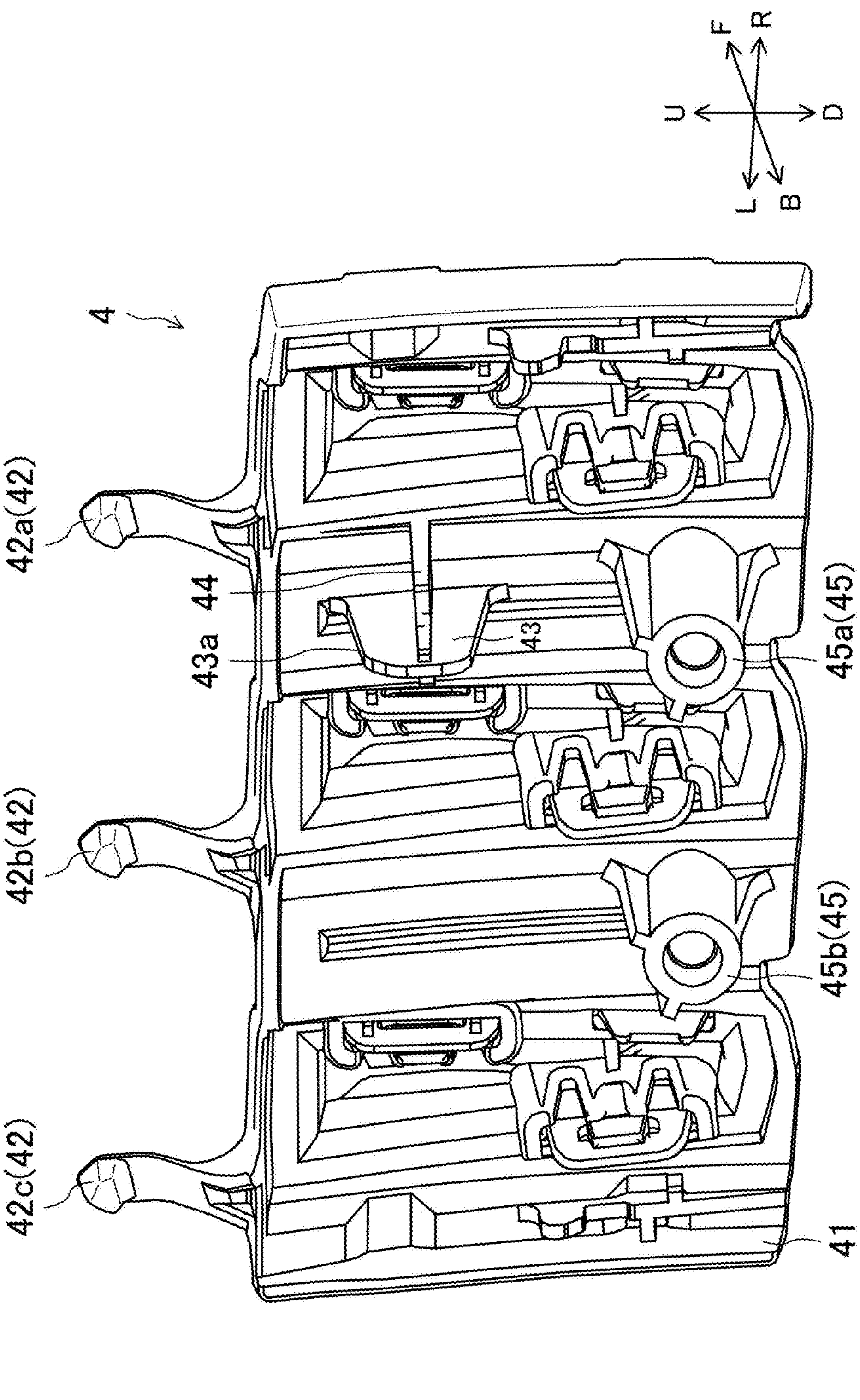
FIG. 3 is a perspective view of a first member before attaching.
Figure 4:
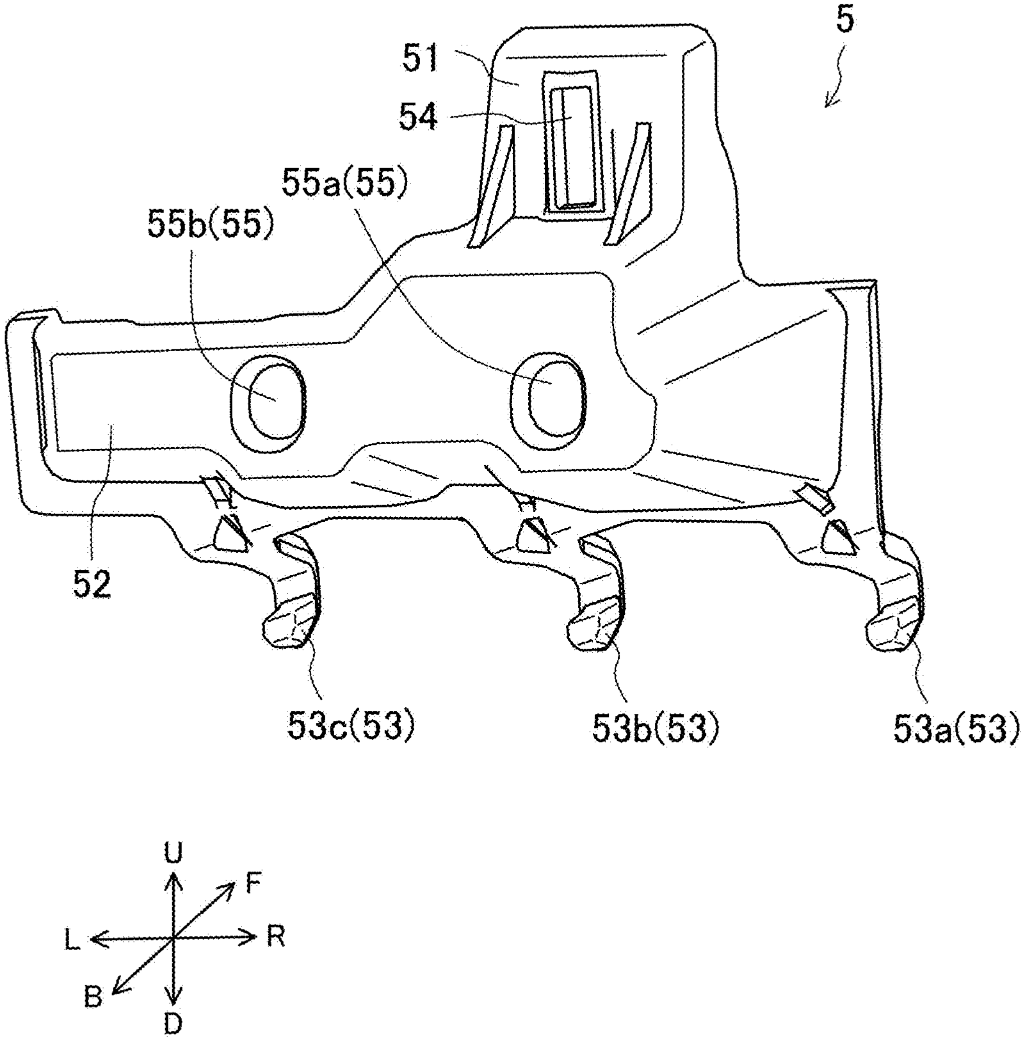
FIG. 4 is a perspective view of a second member before the attaching.

Next, a structural example of the decorative member 3 will be described referring to FIGS. 3-5.

A structural example of the first member 4 will be described referring to FIG. 3. FIG. 3 is a perspective view of the first member 4 before being attached to the grill member 2, when viewed from a rear-right side of the vehicle. The first member 4 is a resin-made member, which comprises a body portion 41, plural first engaging portions 42, an engaging portion 43, a rib portion 44 which is provided at the engaging portion 43, and plural first insertion holes 45, which are integrally formed with the body portion 41.

The body portion 41 extends in the vehicle width direction and in the vehicle vertical direction. A design surface is formed at a front side of the body portion 41.

The plural first engaging portions 42 extend upward from an upper end of the body portion 41. The plural first engaging portions 42 are configured to be separated from each other in the vehicle width direction. An upper-end portion of each of the first engaging portions 42 is bent rearward in a hook shape. The plural first engaging portions 42 engage with the lateral portions 21 from a front-and-upper side.

The plural first engaging portions 42 include a right-side first engaging portion 42*a* which is arranged at the rightmost side R in the vehicle width direction, a left-side first engaging portion 42*c* which is arranged at the leftmost side L in the vehicle width direction, and a central first engaging portion 42*b* which is arranged between the right-side first engaging portion 42*a* and the left-side first engaging portion 42*c* in the vehicle width direction.

The engaging portion 43 projects rearward from the body portion 41 and extends in the vehicle longitudinal direction and in the vehicle vertical direction. The engaging portion 43 is formed in a trapezoidal shape such that it expands in the vehicle vertical direction from its tip toward its base end in a side view. An inclined portion 43*a* which is inclined upward from a lower side is formed at an upper-side portion of the engaging portion 43 in an area extending from a tip of the engaging portion 43 to a base end of the engaging portion 43. Further, the engaging portion 43 is positioned between the right-side first engaging portion 42*a* and the central first engaging portion 42*b* in the vehicle width direction.

The rib portion 44 is formed along both-side faces, in the vehicle width direction, of the engaging portion 43. The rib 44 protrudes rearward from the body portion 41 and extends in the vehicle longitudinal direction and in the vehicle width direction. The rib portion 44 is formed in the trapezoidal shape such that it expands in the vehicle vertical direction toward the body portion 41 in a plan view. The rib portion 44 increases the rigidity of the engaging portion 43. Herein, a rear end of the rib portion 44 is positioned on a forward side of a rear end of the engaging portion 43.

The plural first insertion holes 45 are configured such that fastening members 6, described later, are inserted into these holes 45. The first insertion hole 45 is formed in a hollow-cylindrical shape which protrudes rearward from the body portion 41. A first insertion hole 45*a*, one of the first insertion holes 45, is formed just below the engaging portion 43. Another first insertion hole 45*b* is formed at a position which is located at the same level as the first insertion hole 45*a* and between the left-side first engaging portion 42*c* and the central first engaging portion 42*b* in the vehicle width direction.

Next, a structural example of the second member 5 will be described referring to FIG. 4. FIG. 4 is a perspective view of the second member 5 before being attached to the grill member 2, when viewed from the rear-right side. The second member 5 is a resin-made member, which comprises an upper-side body portion 51 and a lower-side body portion 52 which are formed integrally, plural second engaging portions 53, an engaged portion 54, plural second insertion holes 55.

The upper-side body portion 51 extends in the vehicle width direction and in the vehicle vertical direction. An upper end of the upper-side body portion 51 is configured to be bent forward. The lower-side body portion 52 protrudes rearward in the side view and opens at its front side. The lower-side body portion 52 is formed integrally with the upper-side body portion 51 such that it extends downward from a lower end of the upper-side body portion 51.

The plural second engaging portions 53 extend forward from a lower end of the lower-side body portion 52. The plural second engaging portions 53 are configured to be separated from each other. A front-end portion of each of the second engaging portions 53 is bent rearward in a hook shape. The plural second engaging portions 53 engage with the lateral portions 21 which are located below the first engaging portions 42 from a front-and-lower side.

The plural second engaging portions 53 include a right-side second engaging portion 53*a* which is arranged at the rightmost side, a left-side second engaging portion 53*c* which is arranged at the leftmost side, and a central second engaging portion 53*b* which is arranged between the right-side second engaging portion 53*a* and the left-side second engaging portion 53*c* in the vehicle width direction.

The engaged portion 54 is a rectangular-shaped hole which is formed at the upper-side body portion 51 and extends in the vehicle vertical direction in an elongated shape. A pair of triangular-shaped ribs, in the side view, are formed at both sides, in the vehicle width direction, of the engaged portion 54. These ribs serve as a reinforcing member to connect the upper-side body portion 51 and an upper face of a protrusion portion of the lower-side body portion 52.

The plural second insertion holes 55 are configured such that the fastening members 6, described later, are inserted thereinto. The second insertion hole 55 is a circular hole which is formed at a face of the protrusion portion of the lower-side body portion 52 which extends in the vehicle vertical direction and in the vehicle width direction. A second insertion hole 55*a*, one of the plural second insertion holes 55, is formed just below the engaging portion 43. Another second insertion hole 55*b*, the other one of the plural second insertion holes 55, is formed at a position which is located at the same level as the second insertion hole 55*a* and between the left-side second engaging portion 53*c* and the central second engaging portion 53*b* in the vehicle width direction.

Next, a relationship of the first member 4 and the second member 5 will be described referring to FIG. 5. FIG. 5 is a view of an area shown in FIG. 2, when viewed from a rear side of the grill member 2. The decorative member 3 comprises the first member 4 and the second member 5 which is positioned behind the first member 4.

Figure 5:
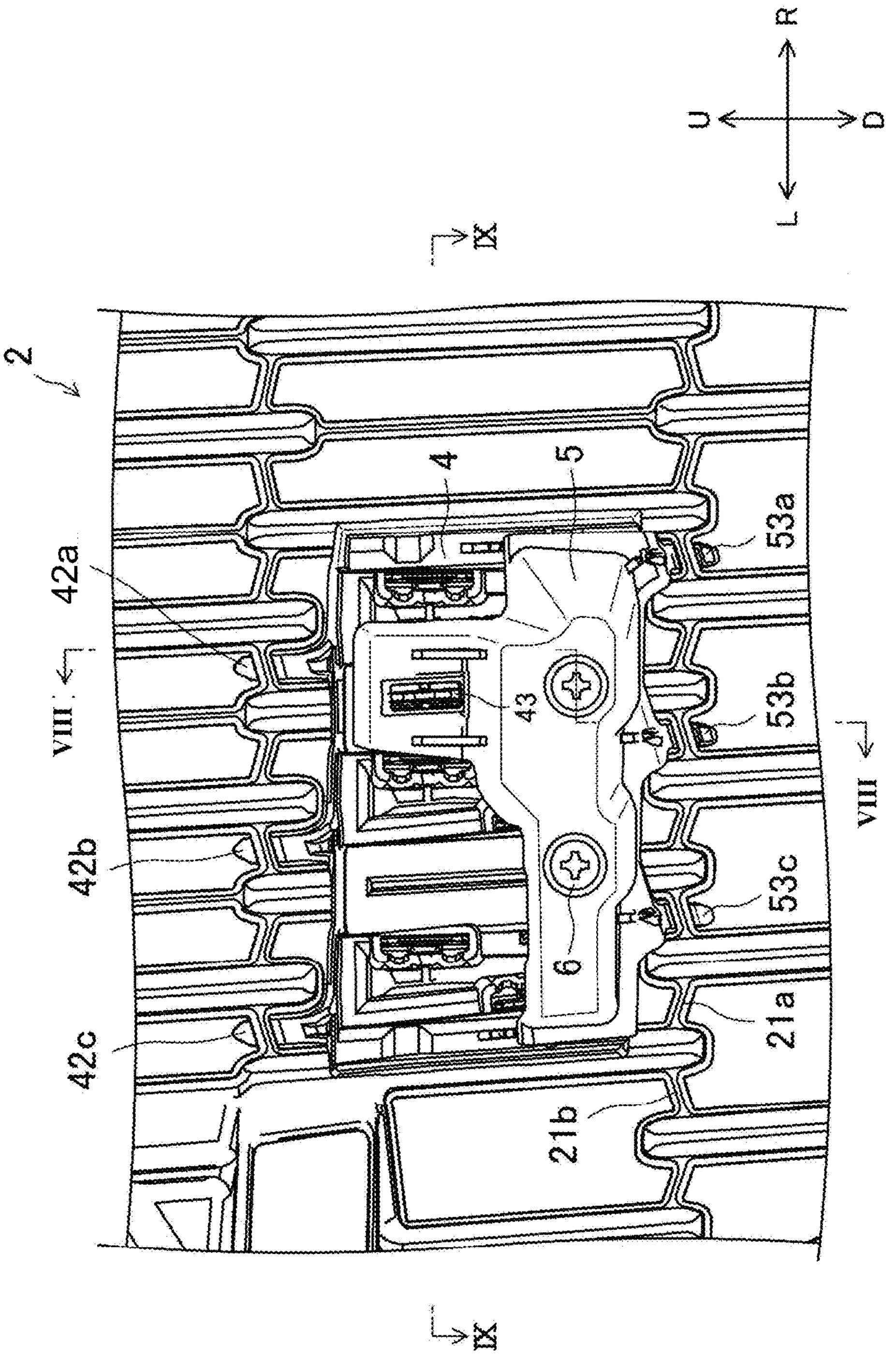
FIG. 5 is a back-face view showing the decorative member attached to the grill for the vehicle in the front structure of the vehicle according to the embodiment.

As shown in FIG. 5, a positional relationship of the first member 4 and the second member 5, when viewed from the rear side of the grill member 2, in a case where the first and second members 4, 5 are attached to the grill member 2 is as follows. The right-side second engaging portion 53*a* is positioned on the right side of the right-side first engaging portion 42*a*, the central second engaging portion 53*b* is positioned between the right-side first engaging portion 42*a* and the central first engaging portion 42*b*, and the left-side second engaging portion 53*c* is positioned between the central first engaging portion 42*b* and the left-side first engaging portion 42*c*.

The engaged portion 54 overlaps the engaging portion 43 in the vehicle longitudinal direction so that the engaging portion 43 can be inserted into the engaged portion 54. The second insertion hole 55*a* overlaps the first insertion hole 45*a* in the vehicle longitudinal direction, and the second insertion hole 55*b* overlaps the first insertion hole 45*b* in the vehicle longitudinal direction. As described later, the plural fastening members 6 are inserted into the plural second insertion holes 55 and the plural first insertion holes 45, respectively, so that the first and second members 4, 5 are fastened together.

Figure 6:
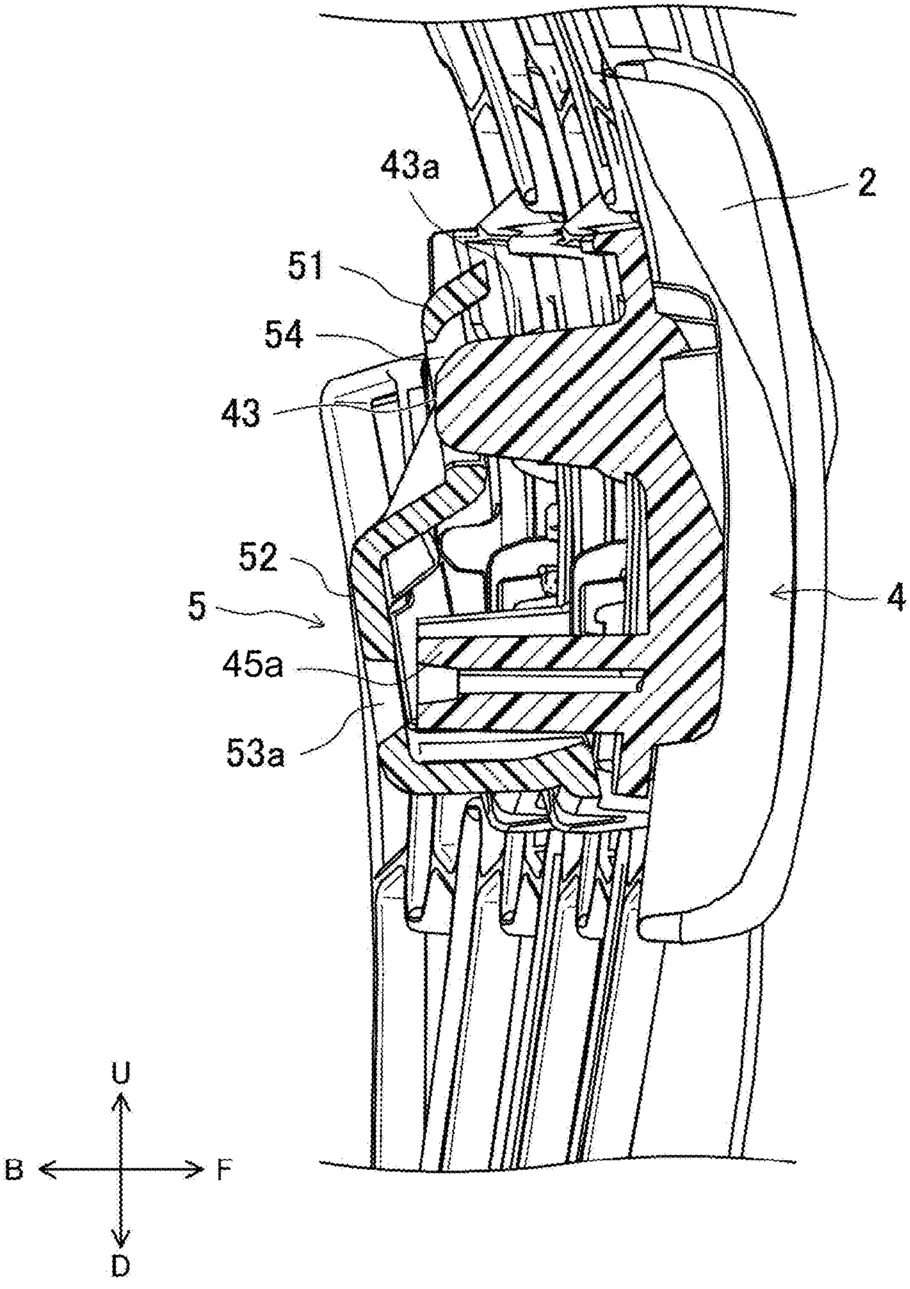
FIG. 6 is a sectional view showing a positional relationship of an engaging portion and an engaged portion.

Next, an attaching manner in which the decorative member 3 is attached to the grill member 2 will be described referring to FIG. 6.

First, the first member 4 is attached to the grill member 2. After the plural first engaging portions 42 are inserted into gaps between the adjacent vertical portions 2, 2, the hook-shaped portions of their upper-end portions come to engage with the first lateral portions 21*a* from the front side and the upper side of the grill member 2. Thereby, the first engaging portions 42 contact upper faces of the first lateral portions 21*a* at the hook-shaped portions of their upper-end portions, thereby restricting the first member 4 from moving downward.

Then, the second member 5 is attached from the rear side of the grill member 2. After the plural second engaging portions 53 are inserted into gaps between lower end of the first member 4 and the vertical portions 2, the hook-shaped portions of their upper-end portions come to engage with the first lateral portions 21*a* from the front side and the lower side of the grill member 2. Thereby, the second engaging portions 53 contact lower faces of the first lateral portions 21*a* at the hook-shaped portions of their upper-end portions, thereby restricting the second member 5 from moving upward.

Next, the engaging portion 43 engages with the engaged portion 54. As described above, the inclined portion 43*a* which is inclined upward from the lower side is formed at the upper-side portion of the engaging portion 43 in the area extending from the tip of the engaging portion 43 to the base end of the engaging portion 43. Thereby, as shown in FIG. 6, the upper portion of the second member 5 is moved from a state where the upper portion of the second member 5 is inclined rearward relative to the first member 4 so that the engaging portion 43 is inserted into the engaged portion 54. Consequently, the engaging portion 43 engages with the engaged portion 54.

Herein, the inclined portion 43*a* and an upper side of the rectangular-shaped hole of the engaged portion 54 contact each other. Further, a rear-end portion of the rib portion 44 contacts the second member 5.

Finally, the plural fastening members 6 are inserted in to the plural first insertion holes 45 and the plural second insertion holes 55 which overlap each other, so that the first member 4 and the second member 5 are fixedly fastened.

The decorative member 3 is attached to the grill member 2 in the above-described manner. Further, the design surface of the first member 4 is viewed through the gaps of the grid-shaped grill member 2 in the elevational view. The upper-side body portion 51 and the lower-side body portion 52 of the second member 5 are positioned on the vehicle rearward side of the body portion 41 of the first member 4.

Next, a structure in which the decorative member 3 is attached to the grill member 2 will be described referring to FIGS. 7-9.

Figure 7:
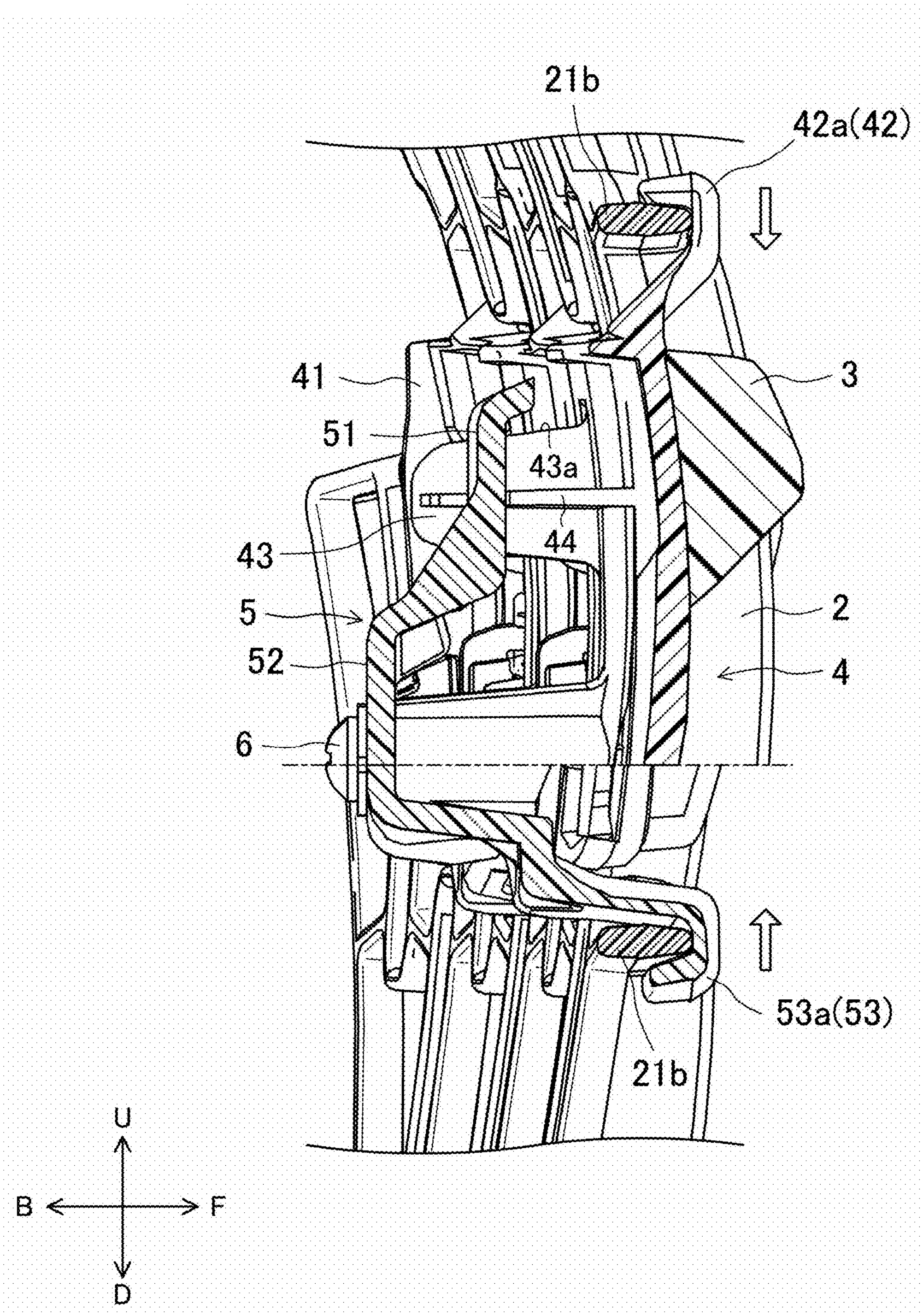
FIG. 7 is a sectional view around the engaging portion.

As shown in FIG. 7, the inclined portion 43*a* of the engaging portion 43 and the upper side of the rectangular-shaped hole of the engaged portion 54 contact each other.

A force of the second member 5 for drawing down the first member 4 acts on a contact portion where the inclined portion 43*a* and the engaged portion 54.

Further, the first engaging portion 42 of the first member 4 engages from the upper side. That is, the first member 4 is restricted from moving downward by the first engaging portion 42.

That is, the upward moving of the first member 4 is restricted by receiving the downward force at the contact portion with the engaged portion 54. Meanwhile, the downward moving of the first member 4 is restricted by the first engaging portion 42 as well. Accordingly, the first member 4 is restricted from moving in the vertical direction.

Meanwhile, a force of the first member 4 for drawing up the second member 5 acts on the contact portion where the inclined portion 43*a* and the engaged portion 54 contact each other. This force is an upward-directed force. Further, the second engaging portion 53 engages with the second member 5 from the lower side. That is, the second member 5 is restricted from moving upward by the second engaging portion 53.

That is, the downward moving of the second member 5 is restricted by receiving the upward force at the contact portion with the inclined portion 43*a*. Meanwhile, the upward moving of the second member 5 is restricted by the second engaging portion 53 as well. Accordingly, the second member 5 is restricted from moving in the vertical direction.

Further, since the inclined portion 43*a* is provided, the engaging portion 43 engages with the engaged portion 54 by gradually moving an upper portion of the second member 5 vehicle forward from a state in which the upper portion of the second member 5 is inclined rearward relative to the first member 4 in the attaching.

Herein, an inclination angle of the inclined portion 43*a* is set at an appropriate angle enough to prevent the engaged portion 54 from sliding in a state where the inclined portion 43*a* and the engaged portion 54 contact each other. Specifically, the inclination angle of the inclined portion 43*a* is set such that a static frictional force generated between the engaging portion 43 and the engaged portion 54 is larger than a rearward-directed force acting on the engaged portion 54 along the inclined portion 43*a* in the state where the inclined portion 43*a* and the engaged portion 54 contact each other.

As described above, the first member 4 and the second member 5 engage with each other by means of the engaging portion 43 and the engaged portion 54, and their upward-and-downward moving, i.e., their moving in the vehicle vertical direction, are restricted. Accordingly, the attaching of the decorative member 3 comprising the first member 4 and the second member 5 can be attained without proving any particular structure at the grill member 2, and the backlash (looseness) of the decorative member 3 in the vertical direction can be suppressed.

Further, both the first member 4 and the second member 5 are attached to the back face of the grill member 2, i.e., to a vehicle-rearward-side face of the grill member 2. Particularly, since the first engaging portion 42 and the second engaging portion 53 engage with the lateral portions 21 from the front side, both the first member 4 and the second member 5 can be attached to the grill member 2 from the same side in their attaching, thereby improving the workability in the attaching.

Figure 8:
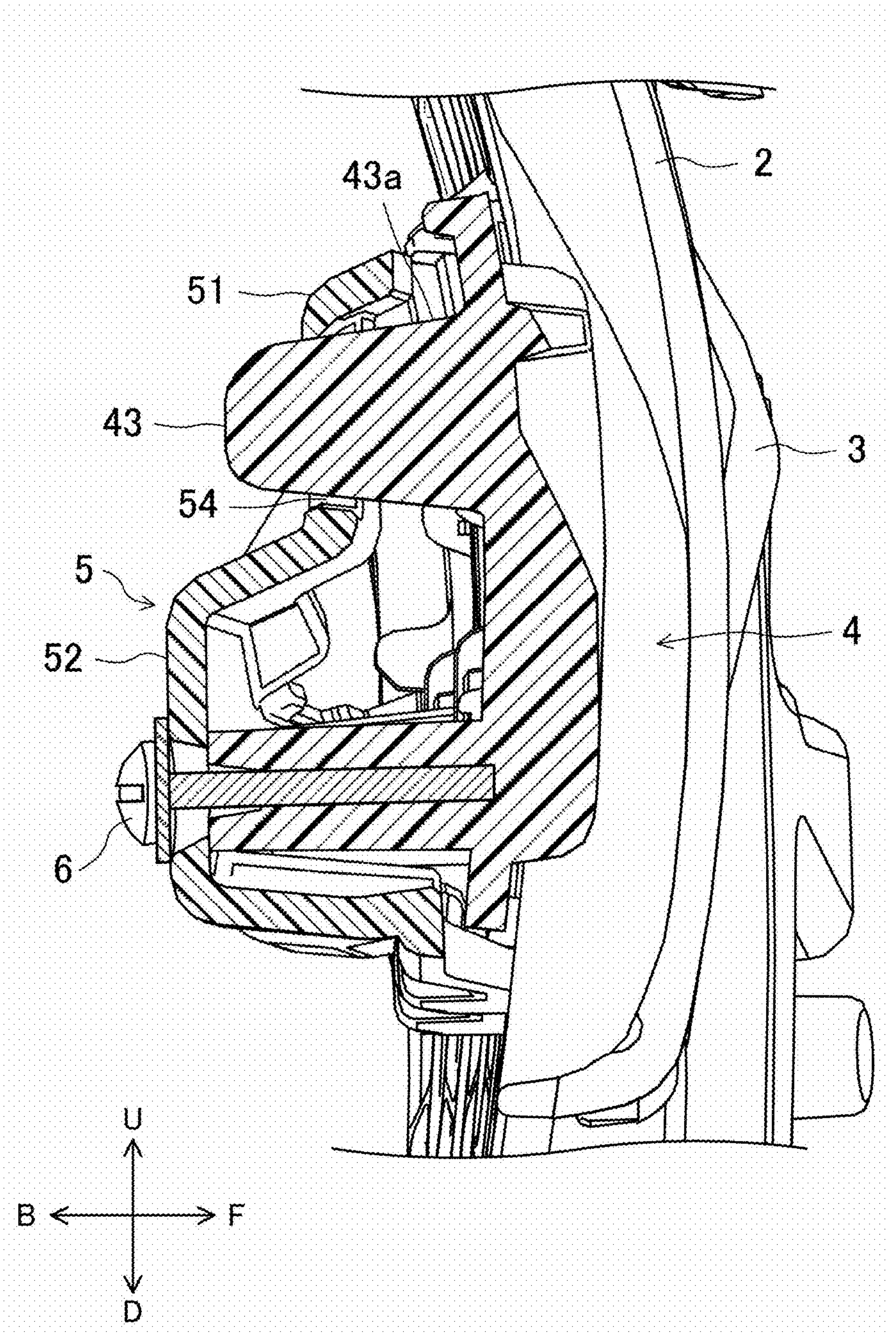
FIG. 8 is a sectional view taken along line VIII-VIII of FIG. 5.
Figure 9:
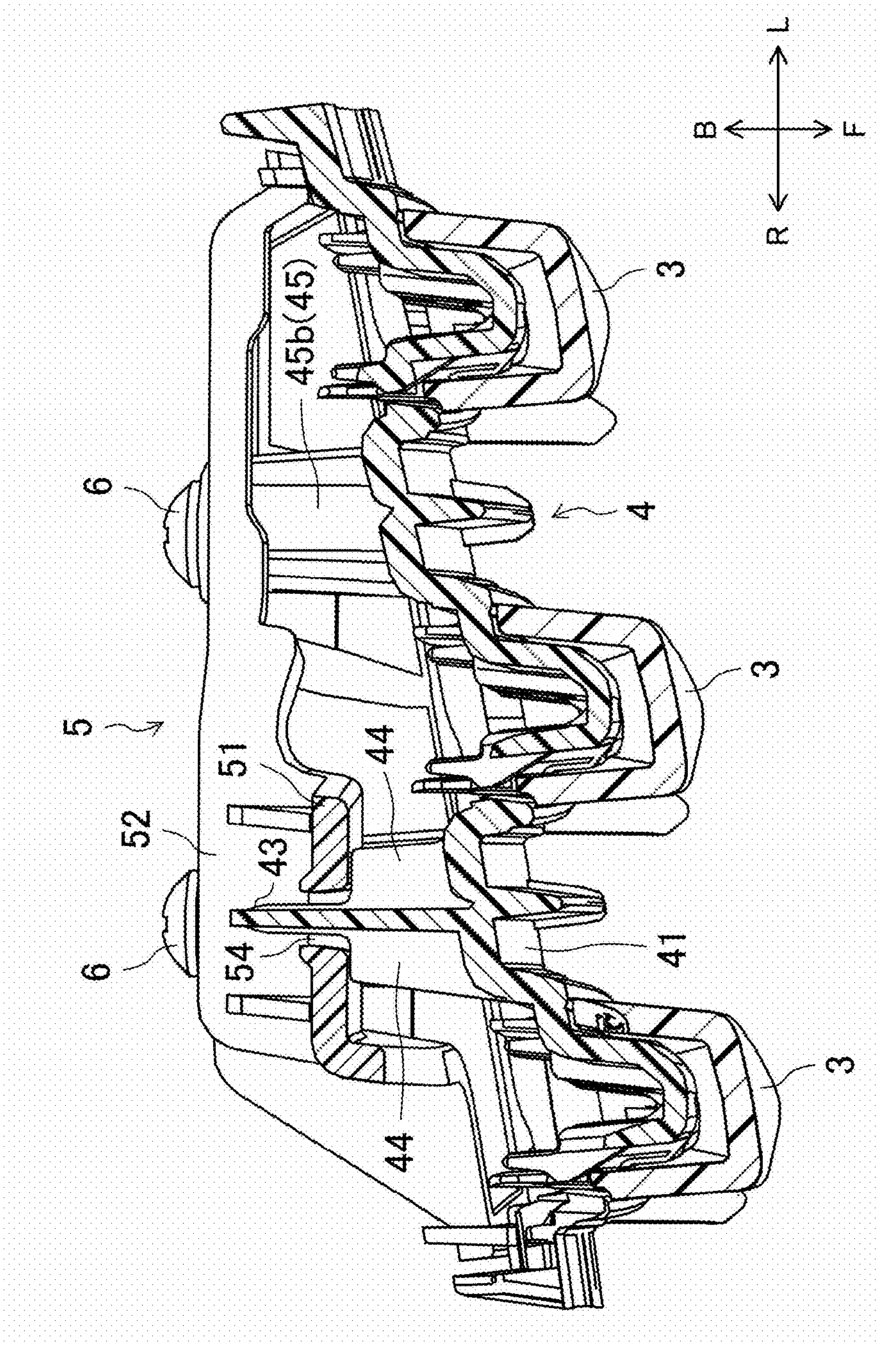
FIG. 9 is a sectional view taken along line IX-IX of FIG. 5.

FIG. 8 is a sectional view taken along line VIII-VIII of FIG. 5. At the engaging portion 43 is provided the rib portion 44 which extends in the vehicle vertical direction and in the vehicle width direction along the respective faces of its vehicle width direction. Thereby, the rigidity of the engaging portion 43 is increased. Further, since a rear end of the rib portion 44 contacts the second member, positioning of the engaging portion 43 and the engaged portion 54 when they engage with each other is facilitated. Accordingly, an appropriate force enough to restrict their moving in the vertical direction but to prevent any improper deformation of those can be inputted to the first engaging portion 42 and the second engaging portion 53.

Further, each of the first engaging portion 42 and the second engaging portion 53 is constituted by plural portions. Accordingly, the moving of these members 4, 5 in the vertical direction can be restricted at different points, thereby securely suppressing the vertical backlash (looseness) of the decorative member 3.

Moreover, the decorative member 3 comprises the plural fastening members 6 to fasten the first member 4 and the second member 5. Accordingly, the first member 4 and the second member 5 are so securely fixed that their vertical backlash (looseness) can be suppressed more securely.

Other Embodiments

The present invention is not limited to the above-described embodiment, but any modifications is applicable within a scope of a spirit of the claims (the present invention).

While the above-described embodiment is configured such that the first engaging portion 42 engages from the upper side and the second engaging portion 53 engages from the lower side, the engaging directions are not limited to these and any direction, i.e., not only the vertical direction but the lateral direction and the longitudinal direction, is applicable as long as the both engaging directions of these portions 42, 53 are opposite to each other.

Further, while the attached member of the above-described embodiment is the grill member 2 which comprises the plural first-and-second lateral portions 21*a*, 21*b* and the plural vertical portions 22 which are all integrated, the present invention is also applicable to an attached member which comprises either one of the lateral portions and the vertical portions.

Moreover, while the inclined portion 43*a* is provided at a whole part of the upper-side portion of the engaging portion 43 in the above-described embodiment, it may be provided partially at a lateral part of the upper-side portion of the engaging portion 43 and the inclined portion may be provided at a front side and a rear side of this lateral part, respectively.

Additionally, while the present invention is applied to the case where the decorative member is attached to the grill member in the above-described embodiment, the attached member is not limited to the grill member of the vehicle and any other members than that provided at the vehicle, such as a fence for an architecture member or various types of grid members for furniture or home electronics, are applicable. The attaching member is not limited to the decorative member but any kinds of members, such as emblem members or sensors, can be used as well.

The members according to the present invention can be used in a case where various types of attaching members are attached to the engaged members.

What is claimed is:

1. An attaching member to be attached to an attached member, wherein said attached member comprises a pair of first frame portions which extend in a first direction, respectively, and are separated from each other in a second direction crossing the first direction, said attaching member comprises a first member including a first engaging portion which engages with the first frame portions from one side of said second direction and a second member including a second engaging portion which engages with a portion of the first frame portion which is positioned on the other side, in the second direction, of said first engaging portion from the other side of said second direction, said first member includes an engaging portion which extends in a third direction crossing both directions crossing said first direction and said second direction and engages with said second member, said second member includes an engaged portion which said engaging portion of the first member engages with, said engaging portion includes an inclined portion which is positioned on said one side of the second direction and extends obliquely from a tip of said engaging portion toward a base portion of said engaging portion and from said other side of the second direction to said one side of the second direction, and a portion of said engaging portion which is positioned on said one side of the second direction engages with said engaged portion of the second member; and the attaching member further comprises a fastening member to fasten said first member and said second member.

2. The attaching member of claim 1, wherein said first engaging portion and said second engaging portion of the attaching member are to engage with said first frame portion of the attached member from the same side of said third direction.

3. The attaching member of claim 1, wherein said engaging portion of the first member is provided with a rib portion which extends in said first direction and in said third direction and contacts said engaged portion of the second member.

4. The attaching member of claim 2, wherein said engaging portion of the first member is provided with a rib portion which extends in said first direction and in said third direction and contacts said engaged portion of the second member.

5. The attaching member of claim 1, wherein each of said first engaging portion and said second engaging portion of the attaching member is constituted by plural portions.

6. An attaching member to be attached to an attached member, wherein said attached member comprises a pair of first frame portions which extend in a first direction, respectively, and are separated from each other in a second direction crossing the first direction, said attaching member comprises a first member including a first engaging portion which engages with the first frame portions from one side of said second direction and a second member including a second engaging portion which engages with a portion of the first frame portion which is positioned on the other side, in the second direction, of said first engaging portion from the other side of said second direction, said first member includes an engaging portion which extends in a third direction crossing both directions crossing said first direction and said second direction and engages with said second member, said second member includes an engaged portion which said engaging portion of the first member engages with, said engaging portion includes an inclined portion which is positioned on said one side of the second direction and extends obliquely from a tip of said engaging portion toward a base portion of said engaging portion and from said other side of the second direction to said one side of the second direction, and a portion of said engaging portion which is positioned on said one side of the second direction engages with said engaged portion of the second member; and wherein said attached member is a grill for a vehicle which comprises said first frame portion and a second frame portion which extends in said second direction.

7. An attaching member to be attached to an attached member, wherein said attached member comprises a pair of first frame portions which extend in a first direction, respectively, and are separated from each other in a second direction crossing the first direction, said attaching member comprises a first member including a first engaging portion which engages with the first frame portions from one side of said second direction and a second member including a second engaging portion which engages with a portion of the first frame portion which is positioned on the other side, in the second direction, of said first engaging portion from the other side of said second direction, said first member includes an engaging portion which extends in a third direction crossing both directions crossing said first direction and said second direction and engages with said second member, said second member includes an engaged portion which said engaging portion of the first member engages with, said engaging portion includes an inclined portion which is positioned on said one side of the second direction and extends obliquely from a tip of said engaging portion toward a base portion of said engaging portion and from said other side of the second direction to said one side of the second direction, and a portion of said engaging portion which is positioned on said one side of the second direction engages with said engaged portion of the second member; and wherein an upper-end portion of said first engaging portion is of a hook shape which bends from one side of said third direction toward the other side of said third direction.

8. An attaching member to be attached to an attached member, wherein said attached member comprises a pair of first frame portions which extend in a first direction, respectively, and are separated from each other in a second direction crossing the first direction, said attaching member comprises a first member including a first engaging portion which engages with the first frame portions from one side of said second direction and a second member including a second engaging portion which engages with a portion of the first frame portion which is positioned on the other side, in the second direction, of said first engaging portion from the other side of said second direction, said first member includes an engaging portion which extends in a third direction crossing both directions crossing said first direction and said second direction and engages with said second member, said second member includes an engaged portion which said engaging portion of the first member engages with, said engaging portion includes an inclined portion which is positioned on said one side of the second direction and extends obliquely from a tip of said engaging portion toward a base portion of said engaging portion and from said other side of the second direction to said one side of the second direction, and a portion of said engaging portion which is positioned on said one side of the second direction engages with said engaged portion of the second member; and wherein a front-end portion of said second engaging portion is of a hook shape which bends from one side of said third direction toward the other of said third direction.

9. The attaching member of claim 1, wherein said first member of the attaching member is a resin-made member.

10. The attaching member of claim 1, wherein said second member of the attaching member is a resin-made member.

* * * * *